Figure 1:
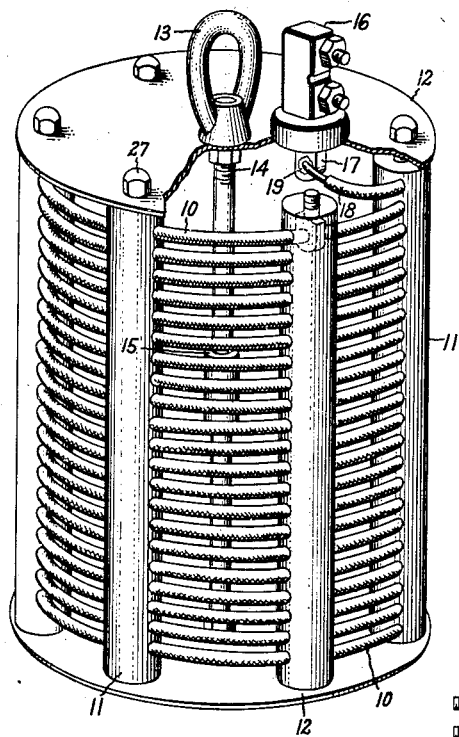

April 3, 1945.   G. D. HOLMBERG ET AL   2,372,950
ELECTRIC INDUCTION APPARATUS
Filed Oct. 30, 1940    2 Sheets-Sheet 1

Inventors:
Gustave D. Holmberg,
Levin W. Foster,
by Harry E. Dunham
Their Attorney.

April 3, 1945.   G. D. HOLMBERG ET AL   2,372,950
ELECTRIC INDUCTION APPARATUS
Filed Oct. 30, 1940   2 Sheets-Sheet 2
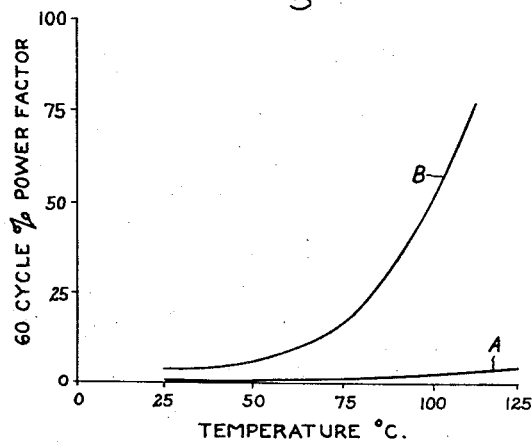
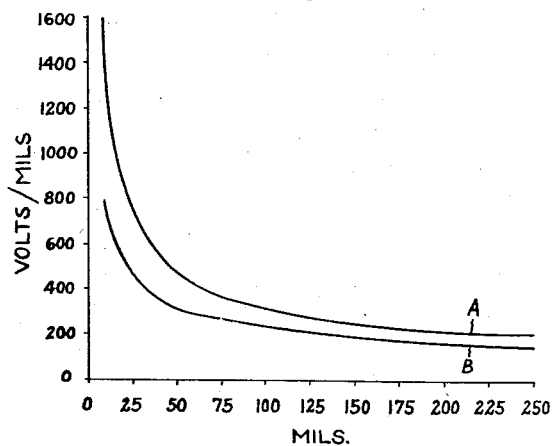
Inventors:
Gustave D. Holmberg,
Levin W. Foster,
by Harry E. Dunham
Their Attorney.

Patented Apr. 3, 1945

2,372,950

UNITED STATES PATENT OFFICE 2,372,950

ELECTRIC INDUCTION APPARATUS

Gustave D. Holmberg and Levin W. Foster, Pittsfield, Mass., assignors to General Electric Company, a corporation of New York Application October 30, 1940, Serial No. 363,530

4 Claims. (Cl. 175—359)

Our invention relates to electric induction apparatus, and although not limited thereto, it has particular application to relatively high voltage reactors of the type which may be used in carrier current wave traps and generator protective systems.

Heretofore, reactors which are generally employed in generator protective schemes and carrier current wave traps have been made with such materials as concrete, hard wood, or porcelain for supporting the turns of the winding. In the design of such electric induction apparatus, as reactors, for the above mentioned uses, it is desirable to be able to hang the reactor in a transmission line in order to eliminate the usual enclosing housing necessary when the reactor is situated on the ground and the usual long leads extending from the top of the tower to the reactor. Furthermore, with a reactor hung in the line heat may be dissipated therefrom at a much higher rate than from a reactor which is on the ground and has an enclosing casing and the necessary insulation to prevent flash-over to ground. The coil supporting arrangement for such reactors should, therefore, be light in weight and strong in both tension and compression in order to withstand the magnetic forces under short circuit conditions, and in considering the materials used heretofore, in connection with these criteria, it was found that concrete is impractical, as it is too heavy and has very little strength in tension. Wood though light in weight does not have sufficient strength in compression since arrangements for fastening a coil to a piece of wood lower its tensile strength, and a relatively large amount of porcelain is required to support the coils as it is relatively poor in tension, thus making the porcelain reactor relatively heavy. Since it is desirable to place a reactor for such an installation out-of-doors, it must be able to withstand the weather and termites, and while concrete and porcelain will withstand the weather and termites fairly well, wood will last only so long as its protective paint. As regards the electrical characteristics for the coil supporting arrangements of such electrical apparatus, concrete is only a fair insulator even when perfectly dry, while wood is a poor insulator. The supports for the coils must also have low power factor at operating conditions and high impulse strength but neither the concrete nor wood has such characteristics. While the electrical properties of porcelain may be satisfactory, its mechanical constants are such that the support members have to be of such size and weight as to make it impractical to hang a porcelain reactor in a transmission line.

It is, therefore, an object of our invention to provide an electric induction apparatus with a coil supporting arrangement which has improved mechanical, electrical, and thermal characteristics.

Another object of our invention is to provide a reactor which will have improved electrical characteristics and will be sufficiently light in weight so that it may be hung on a transmission line.

A further object of our invention is to provide a support for the turns of a reactor which will be light in weight, strong in tension and compression, which will be able to withstand weather conditions, and which will have improved electrical properties.

A still further object of our invention is to provide an electric induction apparatus with an improved support for a winding which will be strong mechanically and which will have a minimum power factor at operating conditions.

Further objects and advantages of our invention will become apparent from the following description referring to the accompanying drawings, and the features of novelty which characterize our invention will be pointed out with particularity in the claims annexed to and forming a part of this specification.

Figure 2:
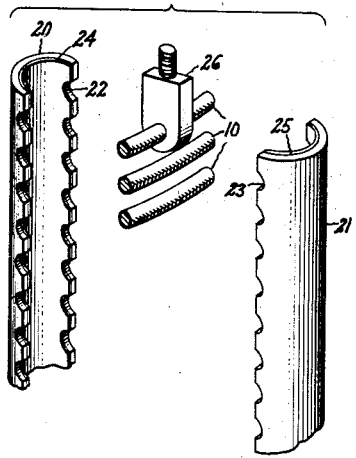
Figure 3:
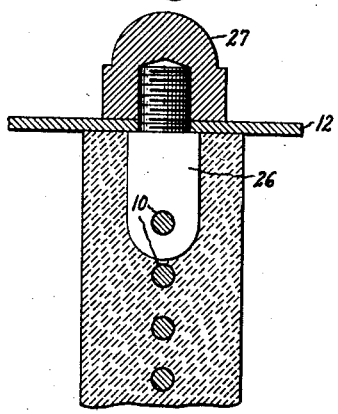
Figure 4:
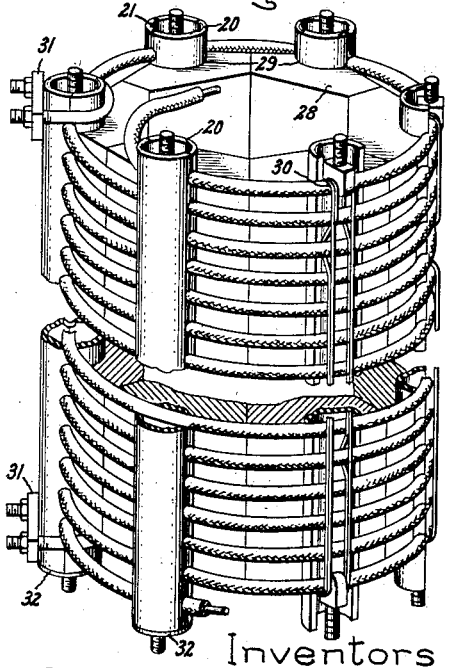

In the drawings, Fig. 1 is a perspective view in partial section of a reactor which is provided with an embodiment of our invention; Fig. 2 is an exploded perspective view of a portion of an arrangement which is provided for holding the turns of the reactor illustrated in Fig. 1 during the process of manufacture; Fig. 3 is an enlarged view of a portion of the supporting arrangement for the turns of the reactor illustrated in Fig. 1; Fig. 4 illustrates a method by which the turns and supporting columns therefor of the reactor illustrated in Fig. 1 are formed; and Figs. 5 and 6 are curves which will be employed in describing the results obtained with our invention.

In the arrangement illustrated in the drawings, we have provided a reactor with a supporting structure for the distributed turns of the winding, the structure including a plurality of cast synthetic resinous columns for supporting the turns at spaced intervals. The synthetic resinous supports are mechanically strong so as to support the windings in spaced relation and have such electrical characteristics that a minimum power factor and high di-electric strength obtain at operating conditions. A cord may be provided to encircle the turns within the cast support and lugs are provided on the end turns, and these lugs also may be cast into the resinous supports. End plates are provided which are bolted to the lugs in order to provide a unitary structure.

Referring more particularly to the drawings, we have illustrated in Fig. 1 a reactor which is provided with a winding having a plurality of turns 10. These turns are suitably disposed, such as being spaced sufficiently far apart so as to allow for proper circulation of cooling air therebetween and are placed as close together as the dielectric strength of the winding support and intervening airgap will permit. In order to support the turns of the winding in spaced relation to each other we have provided a supporting arrangement including a plurality of peripherally spaced axially disposed columns 11 which surround adjacent portions of contiguous turns and also cooperate with end plates 12 or any other suitable relatively rigid means so as to provide a unitary structure. In order that the reactor structure may be hung in a transmission line, hooks or eyes 13 are provided, one being placed at either end of the reactor, the hooks being connected together through a rod 14 which is employed in order to take up the weight of the line between adjacent poles in the transmission system. The rod 14 may be of two metal parts secured together by an insulating block 15 in order to electrically insulate one part from the other. A terminal 16 is provided for connecting one end of the reactor winding to one side of the transmission line, the electrical connection between being made through a lug 17. This lug is electrically connected to an end 18 of the winding in any suitable manner, such as by soldering or brazing, which is indicated at 19. A similar terminal and lug are provided on the opposite end of the reactor for connecting the other end of the winding to the line.

In order to provide a supporting structure for the several turns of the winding which has sufficient strength in both tension and compression, which will withstand the weather and termites, and which will have the proper electrical characteristics such as low power factor, low losses, and good dielectric strength, the columns 11 are formed of a suitable resin, such as a heat-convertible liquid, solventless phenol-aldehyde condensation product in which the catalyst has been removed. This material may be made by reacting one mole of phenol with at least one mole of formaldehyde in the presence of a basic catalyst such as a barium or calcium hydroxide. After the condensation of the phenol and formaldehyde the catalyst may be removed by treating the reaction mass with a precipitating acid, such as sulphuric acid or carbon dioxide in order to give, for example, barium sulphate, barium carbonate, calcium carbonate, etc., which is removed from the condensation product in any suitable manner, such as by filtration. We have found that when the catalyst is removed, the phenol-formaldehyde condensation product has the above outlined electrical characteristics. The filtered condensation product may be concentrated, for example, by distillation in a vacuum until substantially all of the water of reaction is removed. The resulting liquid, solventless phenol-aldehyde condensation product which is substantially free from conducting salts may then be made into any desirable shape, such as by casting into the columns 11, and then readily converted to an insoluble state under the action of heat or heat and pressure. Furfural may be substituted if desired for a portion of the formaldehyde, such as about 20%.

The synthetic resin is cast around adjacent portions of the turns 10 in any suitable manner, such as by providing semi-cylindrical mold portions 20 and 21, of any suitable material such as a paper-base laminated material, with cutout portions 22 and 23, as is illustrated in Fig. 2. Since the phenolic resin has a relatively low specific gravity before it is converted, we found that the mold must be made very tight in order that the resin will not leak out from between the turns 10 and the cutout portions of the mold. Thus, when the mold portions are lined with semi-cylindrical rubber portions 24 and 25, the latter being coated inside with a material such as a latex after the mold had been set up as shown in Fig. 4, a substantially tight mold is provided in which the resin may be cast. Lugs 26 are placed on the turns adjacent the end plate 12, in order that a lug may be cast into the end of each of the columns 11. The end plates 12 are secured to the lugs 26 by nuts 27 as will be seen in Figs. 1 and 3. Thus, portions of each of the turns 10 are surrounded by the cast synthetic material and in this manner a rigid and unitary structure is provided.

The coil of the reactor may be formed in any suitable manner, and as illustrated in Fig. 4 we provide a supporting bracket 28 which is substantially circular in shape and has semi-cylindrical concave portions 29 into which the portions 20 of the molds with their linings 24 are placed. The cable which is to form the turns 10 is then wound around the portions 20 so that it fits into the cutout portions 22 of the mold part 20. The lugs 26 may be then threaded on to the turns and suitably placed within each of the mold portions 20. Similarly, lugs are placed on the bottom end turn. In order to reinforce further the cast phenolic column, a cord 30 of any suitable material, such as jute, may be provided which encircles the turns within the molds. Any suitable number of turns of the cord 30 may be provided and it then may be tied tightly in place, or any other suitable reinforcing means may be provided adjacent the turns and embedded in the resin which is convertible from a plastic to a solid state around the turns. The parts 21 of the molds with their linings 25 may then be placed against the parts 20, clamped securely in place by clamps 31, the inside of the molds being then coated with latex. Gaskets 32 are placed at the bottom of each mold in order to prevent the resin from leaking out during casting. The resinous material described above is then poured into the molds and suitably cured by heat, such as from 50° to 110° C., preferably between 70° and 90° C. It will be noted that the cast synthetic resinous material cures at a temperature below the charring point of the organic material 30, so that it is not damaged during this curing operation. When the resin is cured into a solid infusible state, the bracket 28 is pulled out in sections and the mold portions 20 and 21 are broken off and the winding structure is then in condition to have the electrical connections made between the terminals 16 and the two ends of the coil, the end plates assembled, the connections made between the rod 14 and the hooks 13, and the nuts 27 screwed onto the cooperating portions of the lugs 26.

The resulting columns 11 are light in weight, strong in tension and compression, and will withstand weather conditions.

In order to show a comparison of the results obtained with a cast synthetic resin in which the catalyst has been removed with that in which the catalyst is present, the curves of Figs. 5 and 6 are included. For the purpose of this discussion the letter A is given to each of the curves which represent the resin in which the catalyst has been removed, while the letter B is employed to indicate the resin in which the catalyst is present. Fig. 5 illustrates power factor at low frequencies, that is, at 60 cycles for different degrees of temperature. Since reactors for protective applications are manufactured for about an 80° C., rise, it will be seen that at 100° C., the power factor for the material with the catalyst present is about 50%, while that of the resin which we employ is about 2.5%, or the former has a power factor under normal operating conditions which is about 20 times that which obtains when the catalyst has been removed. Power factor characteristics are very important since a high power factor means high losses and high losses mean an increase in temperature of the insulation which, therefore, causes deterioration and lowering of the dielectric strength thereof over long periods of time, or causes the material to "run away." At high frequencies material A also shows an unexpected improvement in power factor over material B. Thus at 960 k. c. at about 70° C. we were unable to detect any appreciable loss due to the plastic material.

Fig. 6 indicates a comparison of short time breakdown tests in volts per mil at 25° C. of the resin in which the catalyst has been removed with the resin in which the catalyst is present. Although the spread between the two types of resins in breakdown strength is considerable for short time tests, since the material with the catalyst removed has such a low loss, over long periods of time it will be readily apparent that an even much wider variation of dielectric strength between these two materials will be present.

It will be seen, therefore, that we have provided a coil supporting structure suitable for reactors which is light in weight, strong in tension and compression, will withstand weathering, and which has the necessary electrical characteristics for efficient operation. Thus, our improved structure may be employed as a reactor for a carrier current wave trap or in generator protective schemes, since the cast synthetic resinous supports are sufficiently strong to withstand the forces developed under severe conditions, such as a short circuit in the line, which would tend to collapse the windings. The supports also have a relatively high dielectric strength and a very low power factor, that is about 5 per cent or less, for operating temperatures of about 100° C.

Although we have shown and described a particular embodiment of our invention, we do not desire to be limited to the particular embodiment described, and we intend in the appended claims to cover all modifications which do not depart from the spirit and scope of our invention.

What we claim as new and desire to secure by Letters Patent of the United States, is:

1. In a reactor having a winding with a plurality of turns, means for supporting said turns including a plurality of axially disposed synthetic resinous columns cast around adjacent portions of each of said turns, lugs surrounding said portions of the end turns of said winding, and end plates for said winding, said lugs having portions cooperating with said adjacent end plate in order to provide a rigid unitary structure.

2. In a reactor having a winding with a plurality of turns, means for supporting said turns, said means including a plurality of axially disposed synthetic resinous columns cast around adjacent portions of each of said turns, a reinforcing cord encircling said portions of said turns and being cast within said columns, end plates adjacent the ends of said winding, rod means extending between said end plates, hook means outside said end plates and attached to said rod means, and lugs embedded in at least some of said columns and cooperating with said winding and said end plates so that said reactor may be suspended in a transmission line.

3. In a reactor having a plurality of winding turns disposed to form a substantially circular coil, means for supporting said turns including a plurality of axially disposed synthetic resinous columns cast around adjacent portions of each of said turns, lugs surrounding said portions of the two end turns of said winding coil, a reinforcing cord encircling said portion of said turns and being cast within said columns, and end plates closing the ends of said winding coil, said lugs having portions cooperating with said adjacent end plate in order to provide a rigid unitary structure.

4. In an electric induction apparatus having a winding with a plurality of turns, means for supporting said turns, said means including a synthetic resin cast around said turns, relatively rigid means adjacent the ends of said winding, and means including lugs embedded in said resin and cooperating with said winding and with said adjacent rigid means in order to provide a relatively rigid unitary structure.

GUSTAVE D. HOLMBERG.
LEVIN W. FOSTER.